(12) United States Patent
Iritani et al.

(10) Patent No.: US 8,770,183 B2
(45) Date of Patent: Jul. 8, 2014

(54) GLASS ARTICLE

(75) Inventors: Akihiro Iritani, Otsu (JP); Takeshi Nagata, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 983 days.

(21) Appl. No.: 12/866,333

(22) PCT Filed: Jan. 13, 2009

(86) PCT No.: PCT/JP2009/050321
§ 371 (c)(1),
(2), (4) Date: Aug. 5, 2010

(87) PCT Pub. No.: WO2009/098915
PCT Pub. Date: Aug. 13, 2009

(65) Prior Publication Data
US 2010/0313871 A1 Dec. 16, 2010

(30) Foreign Application Priority Data

Feb. 6, 2008 (JP) ................................ 2008-025831
Aug. 5, 2008 (JP) ................................ 2008-201450

(51) Int. Cl.
*F24C 15/10* (2006.01)

(52) U.S. Cl.
USPC ........................................ 126/211; 126/190

(58) Field of Classification Search
USPC ................ 126/211, 190, 25 R, 505
See application file for complete search history.

(56) References Cited

U.S. PATENT DOCUMENTS

| | | | |
|---|---|---|---|
| 3,836,386 A * | 9/1974 | Roy ................ | 428/333 |
| 5,036,831 A * | 8/1991 | Ray ................ | 126/211 |
| 6,582,839 B1 | 6/2003 | Yamamoto et al. | |
| 7,476,633 B2 * | 1/2009 | Comte et al. ........ | 501/7 |
| 8,216,662 B2 * | 7/2012 | Hobon et al. ........ | 428/156 |
| 8,318,619 B2 * | 11/2012 | Comte et al. ........ | 501/4 |
| 8,322,273 B2 * | 12/2012 | Coudurier et al. .... | 99/422 |
| 2001/0036547 A1 | 11/2001 | Yamazaki et al. | |
| 2004/0058080 A1 * | 3/2004 | Kawasaki ........... | 427/402 |
| 2005/0076676 A1 * | 4/2005 | Siebers et al. ........ | 65/33.8 |
| 2005/0154112 A1 * | 7/2005 | Shigeru et al. ....... | 524/430 |
| 2005/0252503 A1 * | 11/2005 | Siebers et al. ........ | 126/1 R |
| 2006/0177582 A1 * | 8/2006 | Chandra et al. ...... | 427/250 |
| 2007/0129231 A1 * | 6/2007 | Comte ............... | 501/4 |
| 2008/0190409 A1 * | 8/2008 | Demol et al. ........ | 126/211 |
| 2009/0176024 A1 | 7/2009 | Shigeru et al. | |
| 2010/0101429 A1 * | 4/2010 | Shigeru et al. ....... | 99/324 |
| 2011/0226231 A1 * | 9/2011 | Siebers et al. ........ | 126/211 |
| 2012/0085336 A1 * | 4/2012 | Brunet et al. ........ | 126/211 |

FOREIGN PATENT DOCUMENTS

| | | |
|---|---|---|
| CN | 2217741 | 1/1996 |
| EP | 1 081 108 | 3/2001 |
| EP | 1 132 448 | 9/2001 |
| EP | 1 489 146 | 12/2004 |
| EP | 1 840 093 | 10/2007 |
| JP | 2000-344544 | 12/2000 |
| JP | 2001-180980 | 7/2001 |
| JP | 2001-254072 | 9/2001 |
| JP | 2005-170057 | 6/2005 |
| JP | 2005-281443 | 10/2005 |
| JP | 2008-209104 | 9/2008 |
| WO | 03/080744 | 10/2003 |
| WO | 2008/093715 | 8/2008 |

OTHER PUBLICATIONS

International Search Report issued Apr. 21, 2009 in International (PCT) Application No. PCT/JP2009/050321.
English translation of the International Preliminary Report on Patentability and Written Opinion dated Sep. 7, 2010.
Supplementary European Search Report issued Jun. 13, 2013 in correspoding European Application No. 09707197.1.
Chinese Office Action dated Nov. 30, 2011 with partial English translation.
Chinese Office Action dated May 4, 2011 along with partial English translation.

* cited by examiner

*Primary Examiner* — John K Fristoe, Jr.
*Assistant Examiner* — Umashankar Venkatesan
(74) *Attorney, Agent, or Firm* — Wenderoth, Lind & Ponack, L.L.P.

(57) ABSTRACT

Provided is a glass article, including: a crystallized glass plate; and an antifouling film formed on the surface of the crystallized glass plate and containing a multiple oxide of silicon and zirconium or a mixture of a silicon oxide and a zirconium oxide, in which the antifouling film has a β-OH content of 1 to 300/mm.

6 Claims, No Drawings

GLASS ARTICLE

This application is a U.S. national stage of International Application No. PCT/JP2009/050321 filed Jan. 13, 2009.

TECHNICAL FIELD

The present invention relates to a glass article suited to use in high temperature, and more specifically, to a glass article, which is well suited to top plates for cookers, such as an infrared heating cooker equipped with a radiant heater or a halogen heater, an induction heating (IH) cooker, or a gas cooker, a shelf plate of a microwave oven, a window of a stove, a fireproof window, or the like.

BACKGROUND ART

In recent years, there have been used, as a cooker for household or business use, an infrared heating cooker using a radiant heater or a halogen heater and an induction heating cooker, in place of or together with a conventional gas cooker or the like using a gas range.

As a top plate used for each of those cookers, a heat-resistant substrate made of a non-metal material typified by crystallized glass is used because of being excellent in heat resistance, aesthetic quality, ease of cleaning, or the like. The crystallized glass is particularly suited to a top plate for a cooker because stains, such as oil of food materials or water stain stuck on the crystallized glass may relatively easily cleaned.

Further, besides the top plates for a cooker, a heat-resistant substrate made of crystallized glass, or the like, is used for glass articles, such as a shelf plate of a microwave oven, a window of a stove, or a fireproof window, which becomes high in temperature during its use.

By the way, there is generally known a method for forming a hydrophilic film such as a silica film or a resin film on surfaces of glass articles, such as the top plate for a cooker described above for protections of flaws and for imparting antifouling property. However, there is a problem in that the silica film is easily degraded by an alkaline detergent, and the resin film is easily degraded by an acidic or alkaline detergent. Thus, there is disclosed an antifouling film containing a multiple oxide of silicon and zirconium or a mixture of a silicon oxide and a zirconium oxide as a hydrophilic antifouling film which is highly durable against various detergents (see, for example, Patent Document 1).

CITATION LIST

Patent Document

[PTD 1] WO 03/080744

SUMMARY OF INVENTION

Technical Problem

Patent Document 1 describes that the above-mentioned antifouling film is applicable to a place having a relatively low temperature, such as a washing machine tub, a wash basin, a bathtub, the periphery of a drain outlet, or a faucet. Meanwhile, for example, a top plate for a cooker and a shelf plate of a microwave oven become extremely high temperature on heating surface thereof during cooking. Thus, if the surface is kept long with boiled-over stuff or oil of food materials stuck on the heated part as they are, the stuff and the oil change to baked stains. In addition, when a stove is used for a long period of time, the surface of a window of the stove tends to have soot stains stuck, and a fireproof window tends to have soot stains stuck at the time of a fire. Because the baked stains or the soot stains are stuck to the surface of those glass articles very stiffly, the stains described above are difficult to clean compared with normal stains. When the above-mentioned antifouling film is formed on the surface of a glass article, it is possible to remove stains in a relatively easy manner in the beginning of the use of the glass article. However, repetition of cleaning work results in the wear of the film surface, and film detachment or unallowable improper flaws are produced. When such improper flaws are formed on the surface of the antifouling film, stain fills or enters the flaws, causing lowering the cleaning easiness.

Thus, an object of the present invention is to provide a glass article that is hard to be degraded by wear even if repetitive cleaning is performed particularly with respect to the stains, such as baked stain or soot stain stubbornly stuck to the surface of a glass article.

Solution to Problem

The inventors of the present invention have found that the above-mentioned problem can be solved by a glass article comprising a conventional crystallized glass on which a hydrophilic antifouling film is formed, the antifouling film being rich in silica and zirconium and having a specific content of $\beta$-OH, for example, containing a silicon oxide and a zirconium oxide as a main component, and thus is proposed as the present invention.

That is, the glass article of the present invention is a glass article including: a crystallized glass plate; and an antifouling film formed on the surface of the crystallized glass plate and containing a multiple oxide of silicon and zirconium or a mixture of a silicon oxide and a zirconium oxide, in which the antifouling film has a $\beta$-OH content of 1 to 300/mm.

The antifouling film in the present invention has a structure containing a multiple oxide of silicon and zirconium or a mixture of a silicon oxide and a zirconium oxide. Thus, because the cross-linking of silicon is reinforced by zirconium, the antifouling film can be provided with excellent durability against an acid, an alkali, and the like, compared with a film made of a silicon oxide alone or of a zirconium oxide alone. In addition, because the antifouling film has a $\beta$-OH content of 1 to 300/mm, the antifouling film is provided with good cleaning property to stains stuck stubbornly such as baked stain or soot stain. At the same time, the antifouling film is hard to be degraded by wear even if repetitive cleaning work is performed. It should be noted that the detailed mechanism of this phenomenon has not yet been clarified.

In general, a $\beta$-OH content can be calculated by using the following equation after measurement of an infrared absorption spectrum of crystallized glass using an infrared spectrophotometer.

$\beta$-OH content (/mm)=$\{\log(T3850/T3500)\}/t$

T3850: transmittance near 3850 cm$^{-1}$.

T3500: minimum transmittance of absorption band near 3500 cm$^{-1}$.

t: thickness (mm) of glass plate when spectrum is measured.

Based on the above-mentioned equation, the $\beta$-OH content ($W_1$) of a crystallized glass plate and the $\beta$-OH content ($W_2$) of a crystallized glass plate on which an antifouling film is formed are calculated, and further, based on the following equation, the $\beta$-OH content in the antifouling film can be determined.

(β-OH content in antifouling film)=[$w_2 \times (t_1+t_2) - w_1 \times t_1$]/$t_2$ $w_1$: β-OH content of crystallized glass plate.

$w_2$: β-OH content of crystallized glass plate on which antifouling film is formed.

$t_1$: thickness of crystallized glass plate.

$t_2$: thickness of antifouling film.

In the glass article of the present invention, it is preferred that the antifouling film have a β-OH content of 1 to 150/mm.

In the glass article of the present invention, it is preferred that the antifouling film have a thickness of 10 to 100/mm.

In the glass article of the present invention, it is preferred that the crystallized glass plate be made of $Li_2O$—$Al_2O_3$—$SiO_2$-based crystallized glass. Here, the term "$Li_2O$—$Al_2O_3$—$SiO_2$-based crystallized glass" refers to crystallized glass containing, as essential components, $Li_2O$, $Al_2O_3$, and $SiO_2$ in the composition.

In the glass article of the present invention, it is preferred that the crystallized glass plate have a thermal expansion coefficient in a temperature range of 30 to 750° C. of $-10 \times 10^{-7}$ to $50 \times 10^{-7}$/° C.

A top plate for a cooker of the present invention includes any one of the above-mentioned glass articles.

A method of producing a glass article of the present invention comprises the steps o applying a coating material containing a silicon component and a zirconium component to a crystallized glass plate, and subjecting the crystallized glass plate to heat treatment at 350° C. or more to form an antifouling film.

Patent Document 1 above describes that a coating material containing a silicon component and a zirconium component is applied to the surface of an object, and then the object is subjected to heat treatment at a relatively low temperature of 100 to 300° C. to promote the curing of the coating material, providing a hydrophilic antifouling film. The antifouling film thus obtained exerts desired antifouling property in the above-mentioned place having a relatively low temperature, such as a washing machine tub, a wash basin, or a bathtub. However, the antifouling film is more likely to be degraded by wear when repetitive cleaning work is conducted to tough stain such as baked stain and soot stain stuck on the surface of a glass article whose temperature becomes high during its use, such as a top plate for a cooker. Thus, a coating material containing a silicon component and a zirconium component is applied to a crystallized glass plate, and then the crystallized glass plate is subjected to heat treatment at as high a temperature as 350° C., thereby controlling the β-OH content in an antifouling film. As a result, it is possible to impart excellent wear resistance to the cooking surface of a glass article.

In the method of producing a glass article of the present invention, it is preferred that the coating material containing a silicon component and a zirconium component be applied by screen printing. The screen printing enables easy formation of an antifouling film having a very thin and uniform thickness on the surface of a crystallized glass plate.

DESCRIPTION OF EMBODIMENTS

The glass article of the present invention includes a crystallized glass plate and an antifouling film formed on the surface of the crystallized glass plate and containing a multiple oxide of silicon and zirconium or a mixture of a silicon oxide and a zirconium oxide.

When the components contained in the antifouling film in the present invention are represented by chemical formulae, the multiple oxide of silicon and zirconium is presented by $(SiO_m)_x(ZrO_n)_y$, and the mixture of a silicon oxide and a zirconium oxide is presented by $(SiO_m)_x$ and $(ZrO_n)_y$ (where m and n are each an arbitrary number of 1 to 4, x+y=1)

The content of the silicon oxide in the antifouling film is, in terms of mass %, preferably 1 to 90%, or more preferably 5 to 40%. When the content of the silicon oxide is less than 1%, the glass article tends to be inferior in cleaning property. When the content of the silicon oxide is more than 90%, the glass article is difficult to have sufficient anti-alkali property. It should be noted that in the case of a film containing the multiple oxide of silicon and zirconium, it is preferred that the content of a silicon component in terms of a silicon oxide satisfy the above-mentioned range.

The content of the zirconium oxide in the antifouling film is, in terms of mass %, preferably 1 to 95%, or more preferably 60 to 95%. When the content of the zirconium oxide is less than 1%, the glass article has insufficient anti-alkali property. When the content of the zirconium oxide is more than 95%, the glass article tends to be inferior in cleaning property. It should be noted that in the case of a film containing the multiple oxide of silicon and zirconium, it is preferred that the content of a zirconium component in terms of a zirconium oxide satisfy the above-mentioned range.

The ratio of the silicon oxide to the zirconium oxide in the antifouling film is, in terms of mass ratio, preferably 10:1 to 1:30, or more preferably 3:7 to 1:20. It should be noted that in the case of a film containing the multiple oxide of silicon and zirconium, it is preferred that the ratio of a silicon component in terms of a silicon oxide and the ratio of a zirconium component in terms of a zirconium oxide each satisfy the above-mentioned range. If the content of the silicon oxide becomes more than the above-mentioned ratio (alternatively, the content of the zirconium oxide becomes less than the above-mentioned ratio), the antifouling film is difficult to have sufficient anti-alkali property. On the other hand, if the content of the silicon oxide becomes less than the above-mentioned ratio (alternatively, the content of the zirconium oxide becomes more than the above-mentioned ratio), the glass article tends to be inferior in cleaning property.

In addition to those, if necessary, alkali metals or silver may be appropriately added in order to control the hydrophilicity of the antifouling film, and aluminum or divalent metals such as alkaline earths may be appropriately added in order to improve the strength of the antifouling film, to the extent that the effects of the present invention are not impaired. The mass ratio of those components in the antifouling film is 0.1 to 20% in total.

In the present invention, the β-OH content in the antifouling film is 1 to 300/mm, preferably 1 to 150/mm, more preferably 10 to 150/mm, or still preferably 50 to 100/mm. If the β-OH content in the antifouling film is less than 1/mm, it becomes difficult to sufficiently remove tough stain such as baked stain and soot stain. On the other hand, if the β-OH content in the antifouling film is more than 300/mm, the antifouling film is inferior in wear resistance, and the antifouling film is more likely to have such problems as flaws on the film surface and peel of the film caused by repetitive cleaning.

It should be noted that the β-OH content in the antifouling film can be controlled by, for example, appropriately setting the temperature of heat treatment during formation of a coated film.

The thickness of the antifouling film is preferably 10 to 100 nm, more preferably 20 to 80 nm, still more preferably 30 to 80 nm, particularly preferably 40 to 80 nm, or most preferably 30 to 60 nm. If the thickness of the antifouling film is smaller than 10 nm, the antifouling film tends to be inferior in wear resistance. On the other hand, if the thickness of the antifouling film is larger than 100 nm, forming the antifouling film with a uniform thickness becomes difficult, and the interference fringes due to the antifouling film become highly visible, which is not favorable in terms of appearance.

The center line average roughness Ra on the surface of the antifouling film is preferably 0.20 μm or less, or more preferably 0.10 μm or less. If Ra exceeds 0.20 μm, it becomes difficult to clean the stain that has entered minute recesses on the surface. It should be noted that the lower limit of Ra is not particularly restricted, and the lower limit is virtually 0.01 μm or more.

It should be noted that a decorative layer comprising glass, pigment, and the like may be provided from the viewpoint of designability.

The crystallized glass plate in the present invention is preferably comprising $Li_2O$—$Al_2O_3$—$SiO_2$-based crystallized glass from the viewpoint that the $Li_2O$—$Al_2O_3$—$SiO_2$-based crystallized glass is small in thermal expansion coefficient and has excellent thermal shock resistance.

The crystallized glass plate preferably has a thermal expansion coefficient in a temperature range of 30° C. to 750° C. of $-10\times10^{-7}$ to $+50\times10^{-7}$/° C. Suitable as the crystallized glass having the thermal expansion coefficient is crystallized glass containing, in terms of mass %, a composition of 1 to 7% of $Li_2O$, 10 to 30% of $Al_2O_3$, 50 to 75% of $SiO_2$, 0 to 8% of MgO, 0 to 10% of ZnO, 0 to 8% of BaO, 0 to 7% of $Na_2O$, 0 to 7% of $K_2O$, 1 to 5% of $TiO_2$, 1 to 10% of $TiO_2+ZrO_2$, 0 to 10% of $P_2O_5$, and 0.1 to 3% of a fining agent, in which a β-quartz solid solution crystal or a β-spodumene crystal is deposited.

Particularly preferred is crystallized glass having, in terms of mass %, a composition of 3 to 5% of $Li_2O$, 15 to 25% of $Al_2O_3$, 55 to 70% of $SiO_2$, 0 to 5% of MgO, 0 to 5% of ZnO, 0 to 5% of BaO, 0 to 2% of $Na_2O$, 0 to 2% of $K_2O$, 1.3 to 3% of $TiO_2$, 2 to 6% of $TiO_2+ZrO_2$, 0 to 5% of $P_2O_5$, and 0.1 to 2% of a fining agent, in which a β-quartz solid solution crystal or a β-spodumene crystal is deposited.

It should be noted that the fining agent preferably contains one or more kinds selected from the group consisting of $As_2O_3$, $Sb_2O_3$, $SnO_2$, and Cl.

Examples of the color tone of the crystallized glass plate include transparency, white, and black, and any of them may be adopted.

The top plate for a cooker of the present invention comprises the above-mentioned glass article. The surface of the top plate for a cooker of the present invention may be provided with a protruding portion around a trivet or another protruding portion or a dent portion for the purpose of preventing boiled-over stuff during cooking from spreading to the circumference (or outside) of the top plate.

In addition, in the present invention, the top plate for a cooker may be subjected to bevelling for designability or the like on the part or entirety of the edge surface.

Next, a method of producing the glass article of the present invention is described.

The glass article of the present invention is produced by applying a coating material containing a silicon component and a zirconium component to a crystallized glass plate, and then subjecting the crystallized glass plate to heat treatment to form an antifouling film. A material in the form of a solution or a colloid is preferably used as a material for each component in the coating material.

As materials for a silicon component, preferred are water-soluble salts such as various alkaline silicates; colloidal silica (silica sol); and various silicate alkoxides typified by ethyl silicate. When alkoxides are used, it is preferred to use a sol obtained by temporarily subjecting one of the alkoxides to hydrolysis in the presence of water and a catalyst (acid or alkali), because a good film is obtained.

As materials for a zirconium component, water-soluble salts such as zirconium oxychloride or zirconium oxynitrate; alkoxides such as zirconium tetrabutoxide or hydrolysates thereof; or a zirconia sol are preferably used.

Further, materials for the above-mentioned other components are also prepared if necessary.

Those materials are preliminarily weighed so as to attain a predetermined ratio. It is preferred that a coating material containing those materials be prepared using various organic solvents so that those materials are easily applied to the surface of the crystallized glass plate. As the solvents, preferred are, in addition to water, organic solvents having good compatibility with water such as alcohols, ketones, and the like. At this time, it is preferred that the pH be appropriately adjusted by adding an acid to avoid precipitation and aggregation, or the amount of water be adjusted.

The solid concentration in the coating material is not particularly limited, but the concentration is preferably adjusted to 0.1 to 10% in terms of mass %.

It is preferred that the ratios of the silicon component and zirconium component in the coating material be, in terms of oxides (mass %) , 0 .1 to 9% for silicon oxides and 0. 1 to 9% for zirconium oxides.

It is preferred that the ratio of the silicon component to the zirconium component in the coating material be, in terms of oxides (mass ratio), preferably 10:1 to 1:30, or more preferably 3:7 to 1:20.

It is possible to apply, as a method of applying the coating material prepared as described above to the crystallized glass plate, a known method such as screen printing, a dip method, a spray method, or a coater method. As described previously, in particular, screen printing enables easy formation of a very thin antifouling film having a uniform thickness on the surface of the crystallized glass plate. Specifically, it is possible to easily form an antifouling film having a thickness of 10 to 100 nm on the surface of the crystallized glass plate.

It should be noted that when the antifouling film is formed by screen printing, the viscosity of the coating material can be appropriately changed by using a thickener such as ethyl cellulose to adjust the film thickness.

For example, if the amount of the thickener is increased to raise the viscosity of the coating material (for instance, around 20,000 to 30,000 Pa·s), the antifouling film can have a larger thickness (for instance, 30 nm or more). Note that, in this case, a large amount of the thickener is volatilized during the subsequent heat treatment process, resulting in the increased porosity of the antifouling film, and as a result, the strength of the film tends to be inferior. Thus, as described below, an aqueous solution containing an inorganic anion of two or more valencies such as a phosphate ion is further applied, and then heat treatment is performed, enabling the improvement of wear resistance.

On the other hand, if the amount of the thickener is decreased to lower the viscosity of the coating material (for instance, around 500 to 2000 Pa·s), the antifouling film can have a thinner thickness (for instance, 30 nm or less). In this case, a small amount of the thickener is volatilized during the subsequent heat treatment process, resulting in the decreased porosity of the antifouling film, and as a result, the strength of the film tends to be comparatively good.

Heat treatment to the coating material applied on the crystallized glass plate can form the antifouling film. The temperature of the heat treatment is 350° C. or more, preferably 500° C. or more, or more preferably 700° C. or more. If the temperature of the heat treatment is less than 350° C., the resultant antifouling film tends to be inferior in wear resistance. Meanwhile, the upper limit of the temperature of the heat treatment is not particularly restricted. Too high temperature leads to energy loss, and when a decorative layer is additionally provided, too high temperature causes cracks of the decorative layer. The temperature of the heat treatment is therefore preferably 1000° C. or less, or more preferably 950° C. or less.

The time of the heat treatment is not particularly restricted, and may be appropriately selected from the times between 10 and 30 minutes. When the time of the heat treatment is too short, the resultant antifouling film tends to be inferior in wear resistance. On the other hand, even if the time of heating is too long, no particular problem occurs, but an additional effect is not provided, and energy loss is caused.

It should be noted that an aqueous solution containing an inorganic anion of two or more valencies such as a phosphate ion is further applied to the surface of the antifouling film formed, and then heat treatment is performed, resulting in the improvement of wear resistance. This is probably because the inorganic anion promotes a hydration reaction in the coated film, but its detailed mechanism has not yet been clarified.

In this case, the heat treatment is preferably performed at 150 to 700° C. for about 10 to 30 minutes. Further, the coating method is not particularly restricted, and any known method described previously is applicable.

EXAMPLES

The present invention is hereinafter described in detail based on examples, but the present invention is not limited to those examples.

Examples 1 to 3 and Comparative Examples 1 and 2

First, a solution containing tetraethoxysilane and zirconium tetrabutoxide was used to form a coated film having a thickness of 50 nm and made of a multiple oxide of silicon and zirconium using screen printing on the surface of a transparent crystallized glass plate N-0 having a long side length of 300 mm, a short side length of 150 mm, and a thickness of 0.4 mm and manufactured by Nippon Electric Glass Co., Ltd. (average linear thermal expansion coefficient at 30 to 750° C.: $-4 \times 10^{-7}/°$ C.). Next, heat treatment was performed at each of the temperatures listed in Table 1 to form an antifouling film, thereby providing a top plate for a cooker. The ratio of silicon oxides to zirconium oxides in the resultant antifouling film was 1:9 in terms of mass ratio. It should be noted that no antifouling film was formed in Comparative Example 2.

The $\beta$-OH content in each antifouling film was calculated, in accordance with the method described previously, from the $\beta$-OH content in the crystallized glass substrate and the $\beta$-OH content in the crystallized glass substrate on which an antifouling film has been formed.

The top plate for a cooker was evaluated for its stain removability in the following manner. Commercially available sauce for grilled meat and sugar with soy sauce were applied on the surface of the resultant top plate for a cooker, and the top plate was kept in an electric furnace at 350° C. for 30 minutes. A commercially available towel wet with water was used to wipe off the surface of the glass plate, and its cleaning property was evaluated based on the following criteria. Table 1 shows the results.

⊚: Stain was easily wiped off.
○: Stain was wiped off with difficulty.
x: Stain was not wiped off.

The top plate for a cooker was evaluated for its wear resistance in the following manner. First, a sample having a length of 180 to 280 mm and a width of 40 to 100 mm obtained by processing the top plate was fixed on a sample table of a wear resistance tester. Next, a cleanser (abrasive) was dripped on the sample, and the sample underwent an abrading operation with a 100-mm stroke and 1000 times of reciprocation using a weight (50 mm by 90 mm and 1300 g in weight) with a transparent film stuck on the surface. The antifouling film after undergoing the abrading operation was evaluated based on the following criteria. Table 1 shows the results.

⊚: Almost no change was observed on the film surface.
○: A small number of wear flaws were observed on the film surface, but the top plate can be used without any problem.
Δ: Unevenness in film thickness was present to a small degree, but the top plate is usable.
x: Film detachment occurred.

TABLE 1

|  | Example | | | Comparative Example | |
| --- | --- | --- | --- | --- | --- |
|  | 1 | 2 | 3 | 1 | 2 |
| β-OH content (/mm) | 79 | 36 | 219 | 450 | — |
| Temperature of heat treatment (° C.) | 850 | 650 | 450 | 250 | — |
| Stain removability | ⊚ | ○ | ○ | ○ | x |
| Wear resistance | ⊚ | ○ | Δ | x | — |

As is evident from Table 1, each of the top plates for a cooker in Examples 1 to 3 exhibits good stain removability to baked stain and has excellent wear resistance, and hence, it is found that each has good durability against repetitive cleaning operations. Particularly in Example 1 in which a coating material was subjected to heat treatment at 850° C. to form an antifouling film, both stain removability and wear resistance were very good.

On the other hand, in Comparative Example 1 in which a coating material was subjected to heat treatment at 250° C. to form an antifouling film, and the β-OH content in the antifouling film was 450/mm, stain removability was good, but wear resistance was inferior, and hence, it is found that problems such as film detachment are caused by repetitive cleaning operations.

INDUSTRIAL APPLICABILITY

As described above, the glass article of the present invention is suitable as a top plate for a cooker which is used in an infrared heating cooker equipped with a radiant heater or a halogen heater, an induction heating cooker, and a gas cooker.

It should be noted that the antifouling film in the present invention can be suitably used for, in addition to the top plate for a cooker, the surface of a glass member whose temperature becomes high during its use, such as a cooking shelf for a microwave oven, a heat-resistant glass for a stove, and a fireproof window. In this case, a glass article on whose surface the antifouling film is formed has excellent stain removability to the stains stuck stubbornly to the surface of a glass member, such as baked stain or soot stain, and has excellent wear resistance against repetitive cleaning operations.

The invention claimed is:
1. A glass article, comprising:
a crystallized glass plate; and an antifouling film formed on a surface of the crystallized glass plate and containing a multiple oxide of silicon and zirconium or a mixture of a silicon oxide and a zirconium oxide, wherein the antifouling film has a β-OH content of 1 to 300/mm.

2. The glass article according to claim 1, wherein the antifouling film has a β-OH content of 1 to 150/mm.

3. The glass article according to claim 1, wherein the antifouling film has a thickness of 10 to 100 nm.

4. The glass article according to claim 1, wherein the crystallized glass plate is formed of $Li_2O$-$Al_2O_3$-$SiO_2$-based crystallized glass.

5. The glass article according to claim 1, wherein the crystallized glass plate has a thermal expansion coefficient in a temperature range of 30 to 750° C. of $-10\times10^{-7}$ to $50\times10^{-7}$/° C.

6. A top plate for a cooker, comprising the glass article according to any one of claim 1 to claim 5.

\* \* \* \* \*